United States Patent [19]

Bowman et al.

[11] Patent Number: 5,151,896
[45] Date of Patent: Sep. 29, 1992

[54] MODULAR DIGITAL TELEPHONE SYSTEM WITH FULLY DISTRIBUTED LOCAL SWITCHING AND CONTROL

[76] Inventors: Donald J. Bowman, 135 Grayson Ct., Colorado Springs, Colo. 80906; Jerry D. Crane, 29335 Nole Hace, Boerne, Tex. 78006; Scott G. Edwards; Kathryn M. Edwards, both of 17 Edith La., Wilton, Conn. 06895; Sven R. Englund, 9 Fairty Dr., New Canaan, Conn. 06840

[21] Appl. No.: 586,440

[22] Filed: Sep. 21, 1990

[51] Int. Cl.[5] .................... H04L 12/46; H04L 12/66
[52] U.S. Cl. .................................. 370/85.13; 370/67
[58] Field of Search ............... 370/85.1, 85.11, 85.14, 370/85.13, 66, 67, 58.1, 58.2, 58.3

[56] References Cited

U.S. PATENT DOCUMENTS

| | | | |
|---|---|---|---|
| 4,587,651 | 5/1986 | Nelson et al. | 370/88 |
| 4,597,077 | 6/1986 | Nelson et al. | 370/88 |
| 4,598,397 | 7/1986 | Nelson et al. | 370/110.1 |
| 4,670,873 | 6/1987 | Cour et al. | 370/85.13 |
| 4,787,081 | 11/1988 | Waters et al. | 370/67 |
| 4,792,941 | 12/1988 | Yanosy, Jr. et al. | 370/67 |
| 5,014,269 | 5/1991 | Picandet | 370/85.11 |

Primary Examiner—Douglas W. Olms
Assistant Examiner—Wellington Chin
Attorney, Agent, or Firm—Parmelee, Bollinger & Bramblett

[57] ABSTRACT

A distributed digital telephone system is provided wherein a plurality of telephone consoles have instant access to a plurality of telephone lines wherein in all of the connections within such a system are non-blocking. The system architecture is that of a reverse ratio PBX in which the number of lines exceed the number of consoles and each handset has a reserved time slot on time division multiplex (TDM) highways for internal node or group connections. Accordingly, each handset is guaranteed access to idle lines within any given switching node. The distributed architecture is distinguished from central processing where all call processing is directed through a centralized point. In this decentralized system, all signal conditioning, protection, sensing and control are provided by the resource interface with the TDM highways. Resource data reporting is continually provided to all the resources connected to the system that require it. Redundancy of critical resources is provided in such a manner that only the portion of the system where a fault occurs is disabled while the remainder of the system continues to operate.

18 Claims, 8 Drawing Sheets

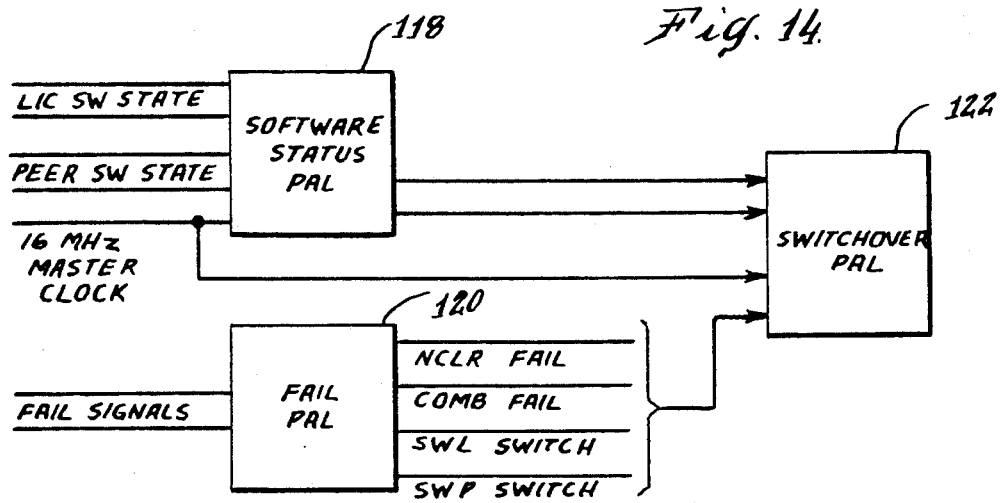
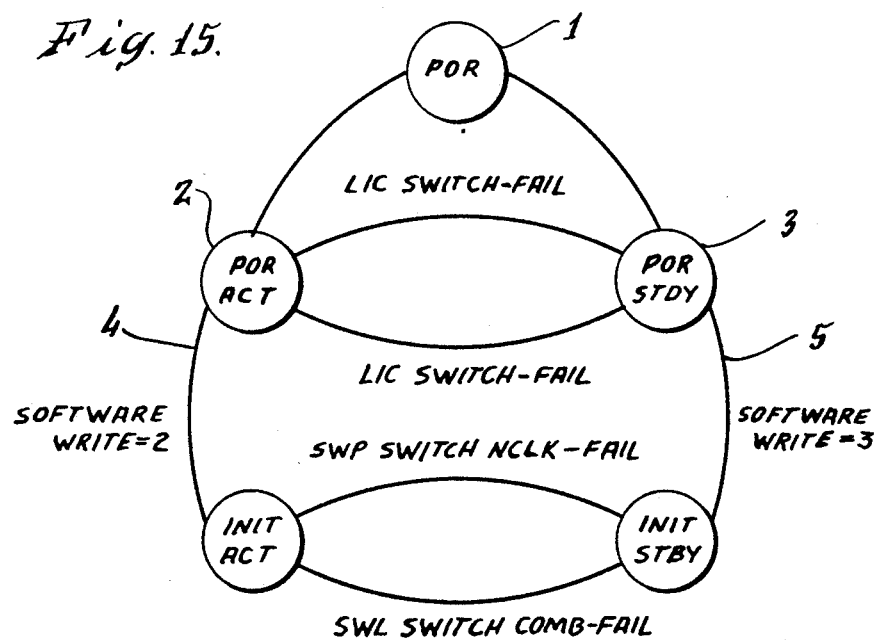

MODULAR DIGITAL TELEPHONE SYSTEM WITH FULLY DISTRIBUTED LOCAL SWITCHING AND CONTROL

BACKGROUND OF THE INVENTION

This invention relates to a modular digital telephone system utilizing time division multiplex switching, and more particularly, to such a system having distributed architecture with fully distributed switching and control a distinguished from centralized processing where all call processing is directed through a centralized point.

Typical PBX telephone exchanges are generally characterized with central processing and in which the number of telephone handsets exceeds the number of outside lines. Accordingly, handset users may be blocked from making outside calls until a particular trunk is free and the call put through. In U.S. Pat. No. 4,597,077, this situation is somewhat alleviated by utilizing a distributed star architecture which employs peripheral switching units (PSU) connected to a central switch or location, and further to employ time division multiplex switching in which communication lines are assigned to each device connected to the line for a relatively short period of time, referred to as time slots. The time slots occur periodically and are repeated at a frequency such that a device attached thereto can send or receive data continuously at a given data rate. A frame is comprised of all of the time slots available for the devices connected thereto.

Digital systems employing time division multiplex in a PBX of the type described in the aforesaid U.S. Pat. No. 4,597,077 still require a central processing unit (CPU) which assigns time slots dynamically. For example, assuming that there are 20 to 100 extensions for each PBX trunk (outside line) each phone call from an extension has time slots assigned dynamically upon call initiation. If the time slots have all been assigned when a call is requested, that particular call is blocked until a time slot becomes available. In addition, of course, the centralized processing provides the status of each line and the extension to all of the consoles which are connected into the system. If something goes wrong in the CPU, the entire system is shut down until the problem in the CPU is located and corrected.

In modular telephone construction, for example, the ViAX instant voice communication system manufactured by the assignee of the present invention, all of the circuitry and electronic components are incorporated on modular cards of integrated circuits which are mounted and interconnected in racks in order to conserve space as well as to provide short interconnecting lines. Accordingly, the telephone system is compactly packaged and configured in such a way as to require limited back room equipment space. The use of the modular cards also allows great flexibility in the expansion and/or configuration of the local telephone system. The system is configured through an external multiple access programable computer and information system data processor. With proper monitoring, the individual cards can be diagnosed for trouble as well as provide redundancy so that if one of the cards should malfunction, repair is simplified by simply replacing the faulty card in the system. However, with central processing, a malfunctioning CPU could cause serious problems in the functioning of the system. Furthermore, in a central controlled environment, the monitoring of all the states of the lines in the system to indicate their condition at any time to a console in the system places a heavy burden on the CPU.

SUMMARY OF THE INVENTION

Accordingly, it is an object of this invention to provide a modular digital telephone system wherein all of the call processing functions of the system are distributed to the particular devices that are connected to the resources being used as distinguished from a telephone system having a centralized point of control.

Another object of this invention is to provide a modular digital telephone system having distributed call processing such that a malfunction of one of the devices responsible for call processing does not shut down the entire telephone system when an individual component breaks down.

Still another object of the present invention is to provide a new and improved modular digital telephone system having distributed call responsibility thereby limiting potential bottlenecks during high system usage which would occur in a system having a central processing unit (CPU).

Yet another object of the present invention is to provide a new and improved modular digital telephone system which locally continually broadcasts resource status and line accessibility to all consoles in the system.

Yet another object of this invention is to provide a branch telephone system with fully distributed call processing which is reliable, compact and has flexibility in configuration and size.

Yet another object of this invention is to provide a new and improved local digital telephone system which is non-blocking in each point of a distributed star network and yet is connectable from one node to another with greater access and less blocking than prior systems.

Still another object of this invention is to provide a new and improved modular digital telephone system which is provided with a redundancy in time division multiplex media such that the system is not shut down when one of the highway media malfunctions.

In carrying out this invention in one illustrative embodiment thereof, a method of communication between central office telephone lines, nodes, workstations and other resources of a modular digital telephone system using shared time division multiplexed (TDM) highway signal paths is provided comprising the steps of mounting a plurality of circuit cards in at least one card cage interfacing with the backplane of the card cage for forming a plurality of TDM highways, and token passing communication media, the Local Area Network (LAN), and Small Area Network (SAN) by interconnecting selected circuitry on the cards on the backplane; coupling telephone resources to said cards permitting the intercommunication between said telephone resources via said TDM highways; dividing said TDM highways into time slots; and performing all call processing between telephone resources by exchanging requests directly on said token passing communication media, SAN and LAN between the telephone resources wishing to communicate whereby signaling between resources is directly exchanged to establish a communication path therewith without a direct current connection or using a central processing unit.

Additionally, resources are continually monitored by broadcasting status sequence numbers over the TDM highway which are responded to by the reporting of change in status which is also broadcast over the TDM highways and continually updated. Monitoring and redundancy of the highways and other critical elements is provided so that faulty elements are switched out of the system permitting the continuation of functioning of the system.

BRIEF DESCRIPTION OF THE DRAWINGS

The invention together with further objects, advantages, features and aspects thereof will be more clearly understood from the following description taken in connection with the accompanying drawings.

FIG. 14 is a block diagram illustrating the switchover logic in relation to software programmed into the digital telephone system.

FIG. 15 is a flow chart illustrating the logic in the control of the states of the link interface cards.

DESCRIPTION OF THE PREFERRED EMBODIMENT

The present telephone system may be characterized as a digital switch permitting switching communication between a large number of resources such as telephone lines or other public resources, telephone handsets, databases, displays, terminals, etc. All of the switching and signaling associated with a group of telephone consoles are regulated by rack mountable cards of integrated circuits. The system differs from typical PBX systems in providing a greater number of lines than telephone handsets as well as eliminating a central point of switching in the typical PBX system as well as non-blocking access.

Figure 1:
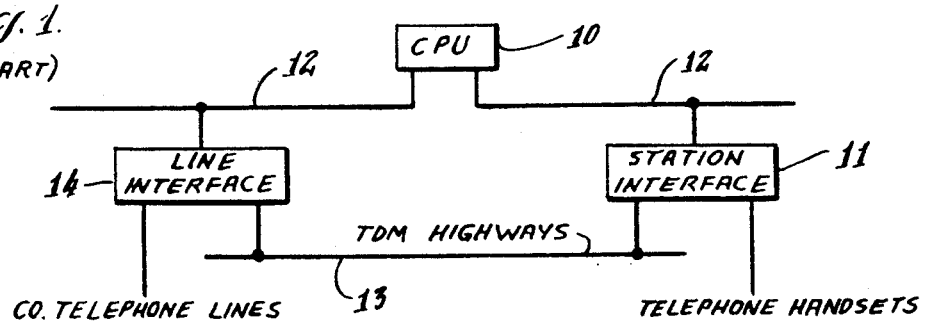
FIG. 1 is a block diagram of a prior art centrally controlled telephone system.

Referring now to FIG. 1, a typical prior art telephone system has a central processing unit (CPU) 10 which is responsible for handling all of the call processing functions in the telephone system. Telephones in the system are connected to a station interface 11 which is capable of connecting the telephone to a data connection line 12 which is connected to the CPU 10 and to a TDM highway 13. A line interface 14 also couples the CPU 10 through the data connection line 12 to outside central office telephone lines. The line interface 14 is also utilized to couple the company telephone lines to the TDM highway 13. In operation, when a telephone in such a system wishes to make a call to an outside telephone line, the station interface 11 connected to that telephone requests the CPU 10 to place the call. The CPU passes a low-level control signal to the line interface 14 which notifies the CPU of the requested task completion and the CPU passes the task completion onto the station interface card 11. Accordingly, any connection between the central office telephone lines and telephone handsets, referred to as resources, is controlled by the CPU 10 in this type of system. In addition, in this type of system the communications bus represented by the data connection line 12 and the TDM highway 13 may be the same medium but do not permit end to end communication between the outside telephone lines and the telephone handset without the CPU 10 being part of that connection.

The central point or CPU type architecture has both problems with capacity and failure. Since all the call processing is done by the CPU, a bottle neck is created during high usage and further, if the CPU fails, then the system malfunctions or, under extreme conditions, may shut down.

Figure 2:
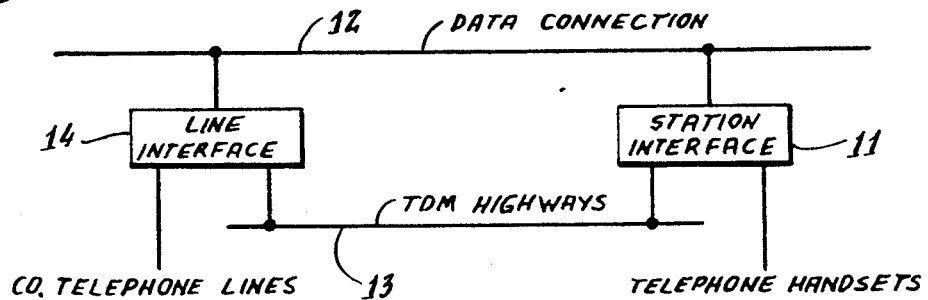
FIG. 2 is a simplified block diagram of the non-centralized switching and control of a modular digital telephone system in accordance with the present invention.

As will be seen in FIG. 2 in accordance with the present invention, no CPU 10 is incorporated in the system. The station interface 11 and the line interface 14 share the data connection 12 allowing each device to communicate with each other device. Both the station interface 11 and the line interface 14 are responsible for performing all call processing interaction. For example, the station interface 11 makes a request for a call directly to the line interface 14, and the line interface replies back to the station interface 11. Accordingly, the request or exchange directly between the interface circuitry is able to perform all of the call processing necessary to allow interaction between the various resources, for example, as shown in FIG. 2, the company telephone lines and the telephone handsets.

Figure 3:
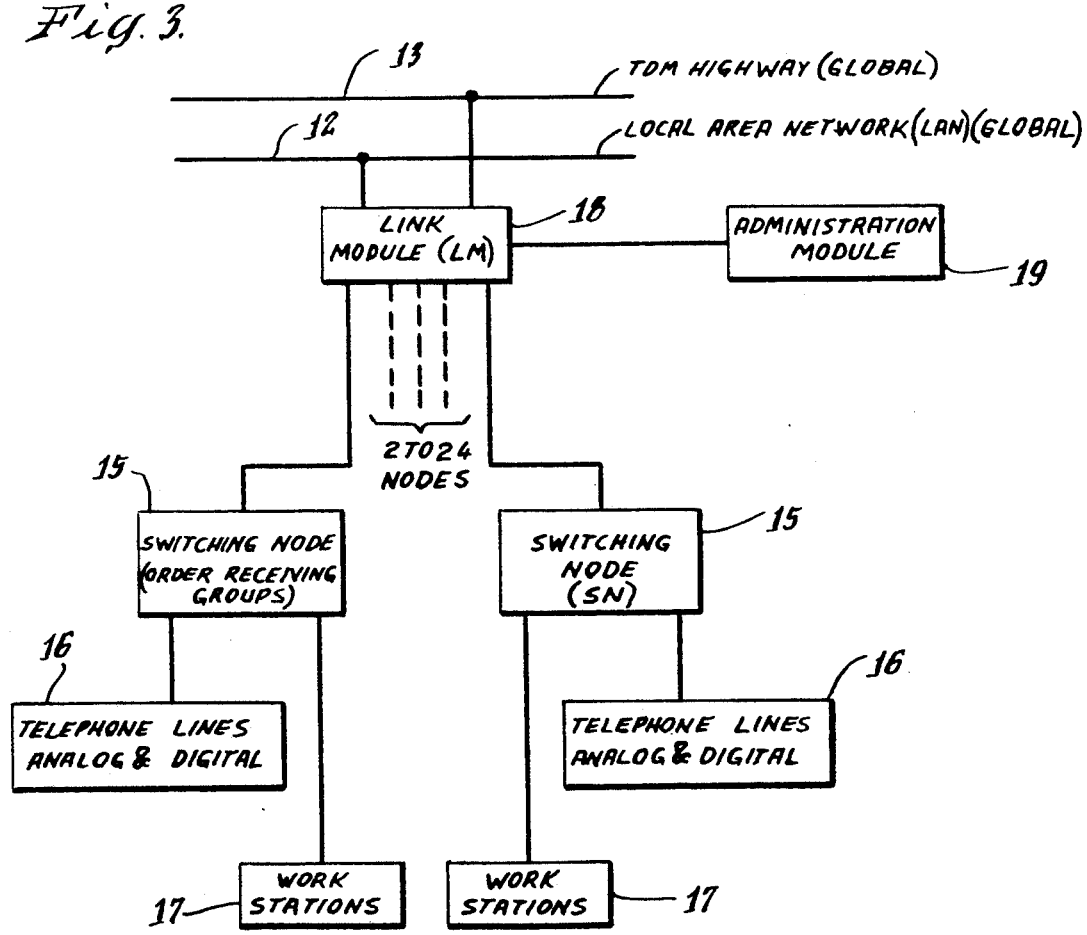
FIG. 3 is a block diagram of the modular digital telephone system in accordance with the present invention.

An implementation of the telephone system broadly illustrated in FIG. 2 shown in FIG. 3 comprises a plurality of switching nodes 15 each of which accommodates both workstation consoles and telephone company (TELCO) lines. Small groups of consoles can share a switching node or large groups can be spread across a switching node boundary. In the case of where one group is spread across a boundary, the group is allocated capacity from global media or highways which are distributed among the switching nodes. Within a given switching node, all the handsets in that node have a reserved capacity providing maximum accessibility to the lines terminated within that switching node so that there is always a non-blocking connection between telephone handsets in that particular group. The size of a particular switching node will depend on a particular application. As an example, a nominal switching node may be configured with 320 analog two wire lines and 48 voice channel consoles. Such an arrangement allows for a seven to one line to console ratio but other ratios can be configured based on the specific requirements of an installation. All connections between the console and the analog lines are non-blocking within a switching node 15. In the illustrated configuration shown in FIG. 3, up to 24 switching nodes are provided which may be expanded for a given application. The switching nodes 15 have central office telephone (TELCO) lines 16 and work stations 17 which would include the telephone handsets, monitors, etc. The switching nodes 15 are interconnected by a link module 18. The link module (LM) 18 provides a connection between the switching nodes 15 permitting work stations 17 and elements therein access to lines that are not present in that particular switching node. The interconnection is performed using time division multiplex highways 13 and data connection lines 12. As will be seen in FIG. 3, the token passing data connection line or media 12 is a local area network (LAN) which provides signaling commands and responses between ORE groups.

The system illustrated in FIG. 3 is a digital system in which all analog inputs from the telephone lines and the handsets at the work station 17 are converted into a standard PCM format (pulse code modulation—digital voice). The PCM data is multiplexed on the high speed buses which are referred to as TDM highways 13. In the system chosen for purposes of example, there are sixteen TDM highways divided into local (accessible only within a switching module) and global (shared across switching modules) highways. The highways may be configurable when installed for local or global operation allowing a range of 4 through 8 local and 8 to 12 global highways. The TDM highways 13 are divided into time slots which are utilized to provide point to point connections. Joining two parties at different workstation handsets requires two time slots while a broadcast connection using tones, music, monitored lines, etc. require one time slot. For further information with respect to digital systems utilizing time division multiplex highways, reference is made to U.S. Pat. Nos. 4,587,651, 4,597,077 and 4,598,397. In the present system each workstation 17 has time slots for handsets utilized with that workstation which are reserved for internal node connections. Accordingly, each workstation is guaranteed access to idle lines within a given switching node 15. For connections outside of the switching node 15, each node is assigned a pool of global highway time slots which are dynamically assigned and thus, access to time slots on global highways provide a possibility of potential blocking. An administration module(s) (AM) 19 coupled to the link module 18 is a computer based system which provides configuration information to the switching nodes and consoles, but does not control the switching functions. It also provides run time diagnostic functions allowing isolation and notification of system faults. A major function of the AM 19 is to perform system management functions and fine tuning of the system. The AM 19 is used for error reporting.

Although only a single TDM highway 13 is shown on FIG. 3, it will be understood that multiple TDM highways are provided, for example, in the present system chosen for purposes of disclosure, 16 TDM highways are apportioned into local highways which are accessible only within a switching module and global highways which are shared across switching modules as previously set forth.

Figure 4:
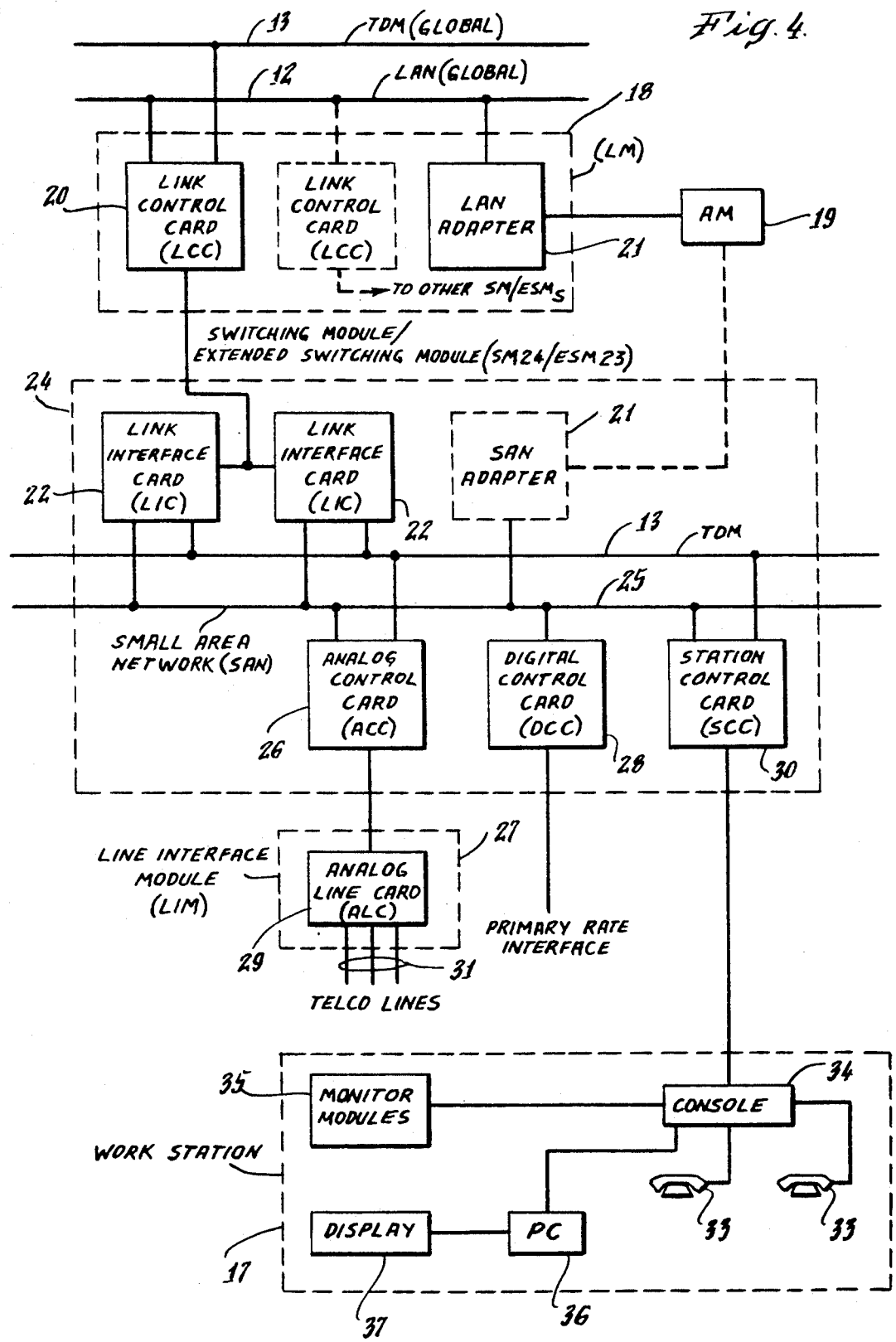
FIG. 4 is a more detailed block diagram of the digital telephone system of FIG. 3 for a single switching node.

The block diagram shown in FIG. 4 illustrates the interconnections of one SN 15. Switching nodes are intercoupled by means of the LM 18 which terminates link interface cables to and from each SN 15. The LM 18 contains a link control card (LCC) 20 which is coupled to the TDM (Global) 13 and LAN 12 highways. The LM 18 also includes a local area network (LAN) adapter 21 coupled to the data connection line or LAN highway or media 12 and the AM 19. The LCC 20 is also coupled to a switching module backplane (SMB) (not shown) which is coupled to link interface cards (LIC) 22 of the switching module 24. The switching module (SM) 24 which is not shown is a card cage designed to be mounted in a standard 23 inch rack or cabinet in which the various integrated circuit control and interconnection cards are assembled. The switching module 24 has a backplane known as the switching module backplane (SMB) which has a plurality of card slots supporting various switching cards to be described hereinafter. Expansion of the system may be accomplished using extender switching modules (ESM) 23 which are connected to the switching module 24 by short multiple conductor cables (not shown) so that the SM 24 and the ESM 23 may be physically located adjacent to each other in the same rack. The SMB provides bus connections for a small area network (SAN) 25 and TDM highways 13 for each switching node 15. Call control and signaling information uses the SAN 25 while the TDM highways carry voice and data traffic. The switching module backplane 79 (SMB) (See FIG. 7) contains the connection points for all of the common control cards. The common control cards connected to the TDM highways provide the communications path with workstations 17 to external lines 31 as well as local switching between workstations. One form of rack mounting, card carrying cages employed to interconnect the various circuits on the integrated circuit cards which may be used in the present invention has been employed in the ViAX telephone system manufactured by the assignee of the present invention. Power supplies and ring generators (not shown) are also mounted in the racks carrying the cards.

It should be pointed out that this system employs a token passing network as opposed to a CSMA/CD (Carrier Sense Multiple Access/Collision Detect) network. This ensures that each digital card will be able to perform call processing in a deterministic fashion which applies to both the SAN 25 and LAN 12.

The redundant LICs 22 provides a plurality of switching node duties which include providing clocks to all of the cards, the allocation of time slots both static and dynamic, clock monitoring for failure detection and the switching to a good clock source, network bridging between SAN and LAN networks as well as others which will be described hereinafter. Since there are two link interface cards 22, there is a complete redundancy for each switching node. The switching module 24 also includes the coupling of the AM 19 through a LAN adapter 21 to a small area network (SAN) 25 when only one SN 15 is involved. The switching module 24 also includes a combination of analog control cards (ACC) 26, digital control cards (DCC) 28 and station control cards (SCC) 30 which are all coupled to the TDM highways 13 and the small area network (SAN) 25. The ACC 26 provides AC termination of 16 analog lines, converts analog voice to and from digital signals, and places and retrieves digital signals onto and from the TDM highways 13. The ACC 26 also provides a dialing interface to the lines and generates line status information. In addition, the ACC 26 is coupled to an analog line card (ALC) 29 in a line interface module (LIM) 27 which couple telephone central office (CO) lines 31 to the switching node 15. The ALC 29 is a CO line interface card with protection and sensing devices that is monitored and controlled by ACC 26. The line interface module (LIM) 27 simply provides card slots for ALC cards 29 providing a capability of plurality of analog lines and distribution of power and ringing voltages. The ALC provides "CO" termination of 16 two wire lines or 8 four wire lines from the central office of the telephone company.

The DCC 28 provides digital line interface which will support two prevalent standards namely, T1 North American Digital Service providing 24 voice channels and CEPT European Digital Service providing 30 voice channels. In addition, the integrated services digital network (ISDN) primary rate interface (PRI) will be supported using both T1 and CEPT providing 23 B&D channels on T1 and 30 B&D channels on CEPT.

The SCC 30 interfaces from one to sixteen workstations to TDM highways 13. The workstation 32 has a console 34 coupled to the SCC 30. The console is provided with a plurality of handsets 33 and is coupled to monitor modules 35, a computer 36 and a display 37. The number of workstations, of course, depend upon the size of the system. The consoles 34 can provide up to a 300 line accessibility with eight voice channels and up to two handsets as well as providing line monitors and intercom modules.

RESOURCE STATUS REPORTING

In the present system, all of the incoming telephone resources; namely, telephone lines, work stations, etc., terminate at a resource interface which does not provide a direct electrical current path to a destination for sensing the telephone resource's state. In addition, the telephone system of the present invention has no central switching so that the status of the connections to the system are not provided at any centralized point where they would be readily available. In fact, the present digital telephone system has a large number of resources which are shared and a large number of destinations. The telephone system of the present invention uses a distributed, computing architecture connected by multiple high-speed, serial digital, informational channels. In accordance with the present invention, the separated resource interfaces determine the state of the incoming resources and encode the information for transmission. The encoded status information is transmitted by the resource interface when prompted by a unique identifier. Such status information is communicated to all system components connected to the TDM highways 13. Interface receivers receive and store the status information and report only the changes in resource status. Each receiver stores the state of all resources terminated in the system, and the information can be readily accessed by the destinations associated with the receiver. By so doing, the system minimizes the amount of information sent to a destination as a point to point message; rather this information is broadcast to all destinations. The interface receivers provide a filtering operation which holds down destination processing and communication requirements and thus improves system response to resource status changes. The system can report the state of all telephone resources terminated therein at a high speed to all destinations.

In a general overview, the digital telephone system of the present invention has a distributed architecture where the telephone resources on the user premises are not terminated at the user destination. The user telephone resource is connected to the digital telephone system alone or with other resources to a resource interface which provides signal conditioning, protection, sensing and control as required by the type of resource. In this system, all resources are terminated on a resource interface with no direct current connection between the resource and any other part of the system. The resource interface reads the state of one or more of the user premise telephone resources which state is encoded to indicate whether the resource is idle, ringing, on hold or in other states. The encoded information is stored in memory on the resource interface prior to transmission to other system components.

Information is distributed through the digital telephone system on a time division multiplex (TDM) electronic media highway or bus. Redundancy is provided such that if one media fails, a backup media or highway can be used to sustain the level of operation. The resource status information is sent from each resource interface to all destinations in the system at regularly predetermined rates. Accordingly, the state of each resource in the telephone system is sent each time whether it is changed or not. The amount of information available at the receivers is redundant, but necessary for rapid fault recovery or new additions without affecting the operation of the other system components.

All of the integrated circuit cards in the digital telephone system have a unique identifying number assigned to them which corresponds to the position of the card in the backplane of a card cage. These numbers, referred to as status sequence numbers (SSNs), are generated in sequence and inserted at the start of each frame on the TDM media 13 in use. When a resource interface recognizes its own identity number, the resource interface serially broadcasts the state of each of its associated resources immediately following the identity number on the TDM media. The identity numbers are generated sequentially to a designated limit value, then repeated. If an identity number has no associated resource interface present, then no status information is written onto the TDM media and the TDM data is the logic default value. A resource status made of all logic default values is null, and therefore ignored as a resource status update.

Each destination or console in the digital telephone system has a defined, accessible list of user premises telephone resources. An indicator is provided at each such resource for indicating the status of each resource in the defined list. If the number of resources in the defined list is less than the number of resources terminated by the system, then only the status of the resources in the destinations defined list need be reported. Normally, a destination console will be interested only in changes of the status of resources. If a resource does not change state between two consecutive reports, then the destination will remember the last resource state displayed for the user, and so will reduce the amount of information to be processed by that particular console destination.

Receivers are connected to the TDM media or highways carrying the resource status information. Each receiver handles one or more destinations and provides resource status individually to each. This process is controlled by a resource status engine 50 (FIG. 5) which will be described hereinafter. The resource status engine 50 receives all the resource status data generated throughout the system, stores and compares new resource status to old resource status information. If no change occurs in the resource's state, or if a change occurred but the resource was not associated with any of the destinations being controlled, then the new data is stored and the next resource information is processed. If a change is detected and one or more of the control destinations is associated with the resource, then the status information along with the resource SSN is passed to the destination interface. The destination interface may provide further status information processing and send the status information to a destination. Finally, the destination employs the status and identity information to correctly indicate the state of the user premises telephone resource.

The user can access any resource in the digital telephone system at any time or change the defined accessible resources utilizing the status engine 50 which provides access to the memory 55 containing the status of all the resources by a receiver. In addition, the LICs 22, which will be explained more in detail hereinafter, generate the SSNs on the TDM highway 13 also checks all highways for a failure. If a failure is detected, the LICs 22 signal the other system components simultaneously to switch to a backup highway. Each of the resource interfaces and receivers can switch between the primary and backup highways. Accordingly, the failure of any resource interface does not affect the operation of more than the resources interfaced to it. Surviving resource interfaces would use the TDM highway as usual or switch to a backup highway if the fault in the resource interface so requires. Accordingly, failures in any part of the system are limited to the parts which affect only that failure, and the LIC 22 is provided with a backup in case of failure there. Redundant communication paths with the system components allow for isolation of the failures where possible and maintenance of functionality though at a degraded speed in the event of failure.

Figure 5:
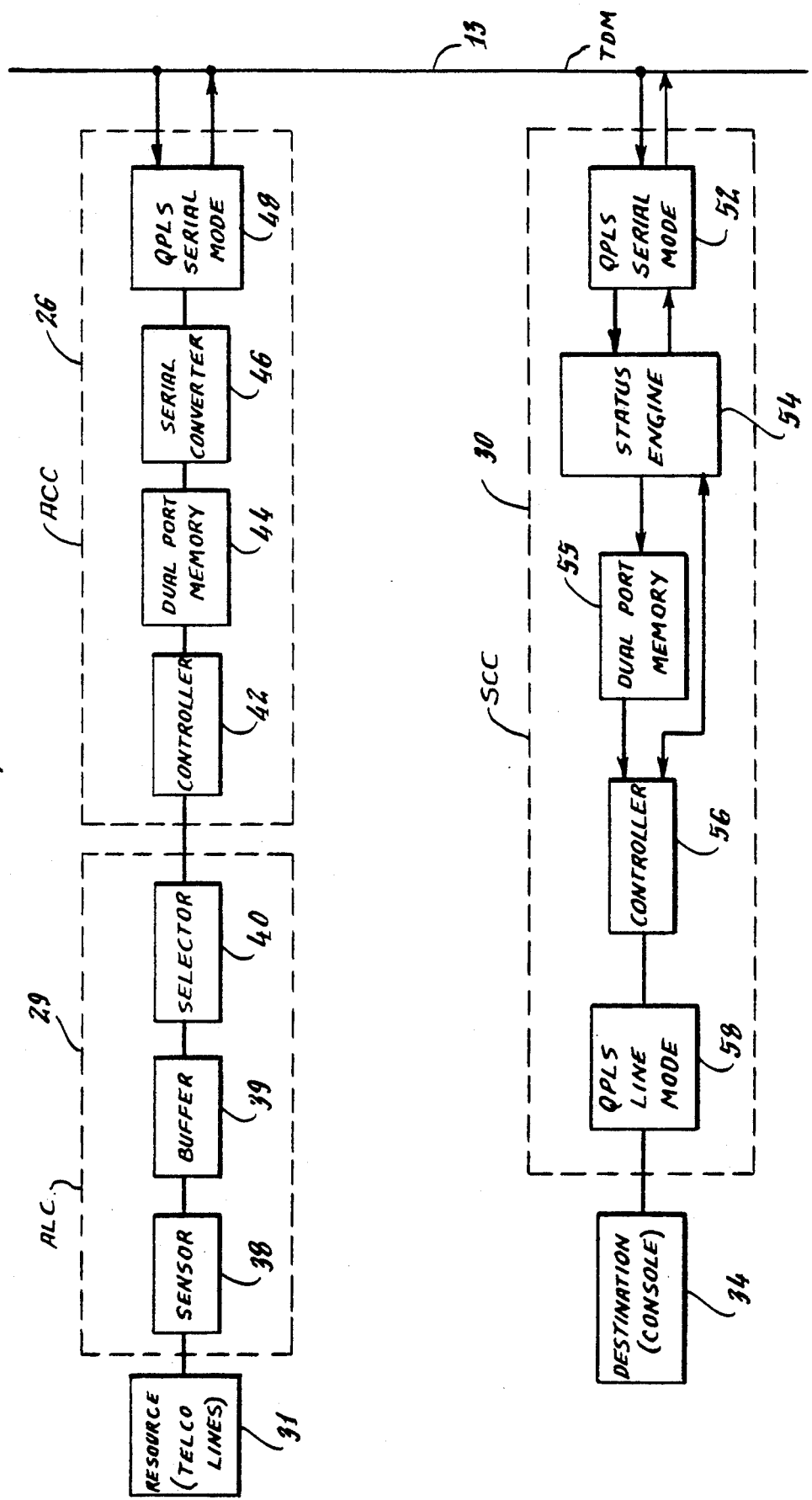
FIG. 5 is a block diagram of the resource status reporting system for the digital telephone system of this invention.

Referring now to FIG. 5, an analog telephone line 31 is connected to the digital telephone system of the present invention by ALC 29. A sensor 38, which includes tip ground, ring and loop current sensors, interfaces with the telephone line 31 producing active low-logic levels when any of the states exist. The sensor is coupled through a buffer 39 to a selector 40 where each signal for each analog line can be individually read. A controller 42, which is coupled to the selector 40, provides a logic or control circuit needed to encode the status of each resource into a number of bits and concatenate or encode any further information associated with the resource. The controller 42 is coupled to dual port storage memory 44 where the information from the controller 42 is written. The controller 42 then detects the resource SSN on the TDM highway 13 and provides clocking to unload information from the dual port memory 44 which is applied to a serial converter 46 and a quad per line switch (QPLS) 48 which interfaces the ACC 26 to the TDM highway 13. The QPLS 48 is a custom IC that interconnects the TDM highway 13 to either the ACC 26 for providing access to TELCO lines 31 or through SCC 30 to provide access to consoles 34. A QPLS 48 includes 4 per line switches (PLS) as well as a diagnostic channel. The PLS takes the contents of a TDM time slot and transfers the data to either a multiplex 2B+D channel that is connected to a console's microtelephone controller (MTC) (see U.S. Pat. No. 4,598,397) or to a CODEC that converts the digital TDM information to analog for line connection (ACC mode). The QPLS may be operated in the serial mode where the contents of contiguous timeslots on the TDM highway are sent or received from rack mounted boards. The transfer mode operation of the QPLS used here is for status information. The QPLS is shown and described in the aforesaid U.S. Pat. No. 4,597,077. The dual port storage memory 44 allows the controller 42 to operate synchronously from the data transfer to highway operation. An example of the controller in the present system is an 8OC188 embedded controller which reads the analog line status. The controller data is written in the dual port ram of the dual port memory 44 and serial transmission of data through the serial converter 46 relies on the QPLS 48 in recognizing the proper resource SSN on the highway 13, and then issuing clock and load pulses.

The TDM highway 13 on which the resource status information is sent, must interconnect all resource interfaces and all receivers. The resource interfaces must be able to read the resource SSN numbers, and write their status information. Receivers need only read the media. The LICs 22 generate the resource SSN numbers and accordingly, must be able to write to the media. Propagation time over the media should be a small fraction of the resource status latency time. The sum of all of the resource status propagation times from the resource interface to the destinations is the latency of a resource status in the system. If the number of status bits in one frame is too small to convey the information held by a resource status interface, then the interface can be assigned more than one identity number to increase the status information reported. In the present system, the media or TDM highway 13 is an open collector driven backplane bus provided on a card cage in which the various integrated circuit cards are inserted. Separate receive and transmit highways are provided which are named for their sense as seen by the receivers. The LICs 22 transmit the SSN numbers on a transmit highway which is received by the resource interface and transmits the resource status information on the transmit highway. The receiver gets all its information from the receive highways.

Accordingly, resource status broadcasts from the receive TDM highway 13 are applied through a QPLS switch 52 to a receiver, referred to as a status engine 54, which is coupled to a processor or controller 56 and through a dual port memory 55 to the controller 56. The controller 56 is coupled through a QPLS 58 to a destination or console 34. The circuitry coupling the console 34 to TDM 13 is the SCC 30. (Also see FIG. 4.)

Figure 6:
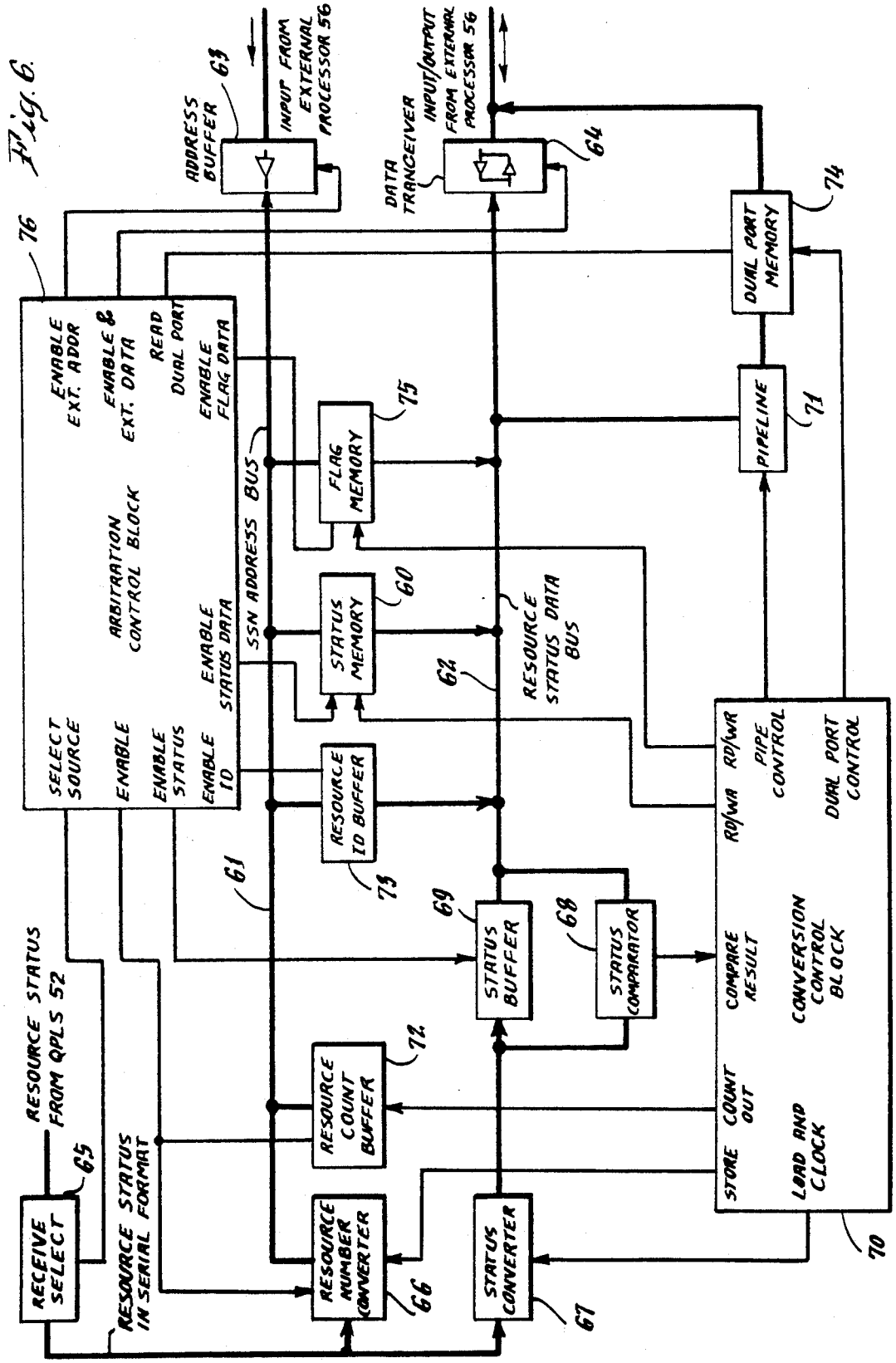
FIG. 6 is a functional block diagram of the resource status engine of FIG. 5.

Before describing the operation of the status engine 54 as illustrated in greater detail in FIG. 6, a very brief summary of what the status engine is looking for is described. The LICs 22 generates SSN numbers on one of sixteen transmit, receive highway pairs illustrated generally on FIG. 5 as TDM highway 13. Each card, for example ACC 26, has a non-specific position in the backplane of a card cage in which it is positioned and that location is binary encoded for that slot. The same connector that picks up the TDM highway, picks up the six encoded bits which indicate which slot of the card in the backplane and whether the card is in a switching module (SM) or an extended switching module (ESM). For a multinode system, the nodes are designated through the LIC 22. The SSN numbers put out by the LIC are provided in time slots and if, for example, ACC 26 recognizes its SSN number, ACC 26 begins to append status bytes right after the SSN number in the time slots so that information is received by all other boards in the system. First, the cards see the SSN number, then immediately after the number, the status which is being reported by the card corresponding to the number that is reporting.

Referring now to FIG. 6, a status memory 60 is coupled between an SSN address bus 61 having an address buffer 63 coupled thereto and a resource status data bus 62 having a data transceiver 64 coupled thereto. The status memory 60 holds the last data reported for each resource in the telephone system. Incoming SSN data is supplied to a receive/select circuit 65 where it is applied to a resource number converter 66 and a status converter 67. The status converter 67 converts the data to parallel form which is applied to a status comparator 68 and a status buffer 69. The other half of the input to the status comparator 68 is applied from the status memory 60 through the resource status data bus 62. The status comparator 68 compares two binary bytes, and if there is no change, then nothing happens. If an output occurs from the status comparator 68 then a status change is recognized and is applied to the conversion control block 70. If there is a change, the change is written back to the status memory 60 because it represents a new status for that SSN number and at the same time, the change is written into a pipeline circuit 71. When the data is applied to the receive/select circuit 65, the first bytes of the data which correspond to the SSN are applied to the resource number converter 66 which forms a portion of the address bus and track is maintained of the entire count. Each status broadcast for the SSN number is made up of 32 bytes, 64 bytes, etc. which is kept track of by the conversion control block 70 which is connected through the resource count buffer 72 in order to provide a full address for the address bus 61. Accordingly, the status memory 60 is addressed which produces a byte output which is brought down to the status comparator 68 in order to compare the new with the old. When the results of the status comparator 68 are compared in the conversion control block 70, all the data is in place, and it is known that the new status bits must be reported as a status change. Accordingly, a resource ID buffer 73 applies the address from the address bus 61 to the data bus 62 which is then written in the pipeline 71. The data bytes written in the pipeline 71 are applied to a dual port memory 74 which is applied directly to the controller 56 of the SCC 30. In the description so far, all of the status report with no changes have been filtered out and accordingly, the processor 56 through the dual port memory 74 would be obtaining a list of all the status changes of the resources in the whole system. However, the controller 56 controls consoles 34 which do not necessarily need to be apprised of the status changes of every single resource in the system. Each console has only a specific list, for example, around 300 or so lines that are associated with each of these consoles or a much smaller number that need be reported to that particular console 34.

Accordingly, a further filter function is provided in the form of a flag memory 75. The flag memory 75 gets the resource address from the resource address bus 61 and the SSN number is applied into the flag memory 75. The flag memory is addressed similar to the status memory 60. The flag memory contains data bits associated with a specific console which indicates if that console is interested in that SSN number of not. For example, a simple flag is provided i.e. a "1" if yes and a "0" if no. The conversion control block 70 is coupled to the flag memory 75 and that information is used to determine whether or not those status bits or those resource status bits need to be written to the dual port memory 74. If a change occurs, and is required to be reported to a console 34 associated with the controller 56, then the status change(s) is written in the dual port memory 74. Accordingly, only lines that are of interest to a particular console associated with a particular controller and only those lines which have a change of state are written in the dual port memory 74. Everything else is filtered out and the processor or controller 56 is not overloaded, and the console 34 does not have to sift through a large amount of data of no interest.

The particular status engine 54 and its associated controller 56 can service multiple consoles and will normally be limited to location in the station control card 30. In other words, the system need only be located where a resource status needs to be reported. In this case, the SCC 30 must report status of the telephone lines 31 to the consoles 34. Accordingly, the ALC 29 and the ACC 26 are reporting status and have no requirement for receiving the status reports. However, another use for the status reports could be a dedicated card to provide call records to record the connections, the phone numbers, the time of the call as well as the persons who initiated the call for monitoring and regulation of the telephone system, and for providing records of what calls were made by whom and for how long. A computer, for example a PC, could interface with such a card to provide necessary records.

The address buffer 63 provides a means for the processor or controller 56 to have access to the status memory 60 and the flag memory 75 to write bit patterns to them and read them back. The data transceiver 64 also couples the controller 56 to the resource status data bus 62 for providing the processor with complete access to the status memory 60 as well as the flag memory 75. An arbitration control block 76 is coupled to the dual port memory 74, the address buffer 63 and the data transceiver 64 for determining which components can utilize the buses 61 and 62 and when. Addresses from the address buffer 63 applied to the address bus 61 are controlled by arbitration control block 76. The data transceiver 64 can either write data into the memories or read it out. The arbitration control block 76 also enables the flag memory 75 for deciding which SSNs are to be reported. The arbitration control block 76 is also coupled to the receive/select circuit 65 which, in effect, selects the QPLS 52 in the SCC 30 which is receiving the broadcast status from the TDM 13. There are four QPLSs in each SSC so the arbitration control block 76 through the receive/select circuit 65 selects the QPLS receiving the broadcast status. The arbitration control block 76 is also coupled to the status buffer 69. The status buffer 69 isolates the new status from the status bus 62 while a comparison is being made in the status comparator 68. When as a result of the comparison, the conversion control block 70 is required to write the results into the pipeline 71, the status buffer 69 conducts in order to feed the data into the pipeline 71. Basically in operation, the conversion control block 70 handles resource data conversion converting the SSN numbers, converting the status bytes per se, analyzing the results of the status comparers, controlling the pipeline, and controlling the dual port memory. The arbitration control block 76 and the conversion control block 70 are commonly coupled to the dual port memory 74 as well as to the resource number converter 66 and the resource count buffer 72, which enables each to keep track of the other, and thus operate synchronously. The arbitration control block 76 basically controls access to the memory, enables rewrites and controls the address buffer 63 and the transceiver 64. It also controls the status buffer 69 in order to determine whether or not line status information is applied to the resource data bus 62.

It should be pointed out that the basic reason for this structure described above is that in a basic analog phone system where solid connections are provided to a voice line, it would be a simple matter to sense the status of the line at each telephone console. However, since there is no direct current connection from the CO line interface at the ALC 29 to the phone console 34 in the present digital system, the ALC 29 and ACC 26 must report the state of lines to which they are coupled to every console in the system. These reports are encoded in a digital format and have all of the remaining consoles and lines coupled to that electronic media so that status reporting is available at all times. However, the system also basically filters out a large amount of information which is unused by a particular destination or console which is only interested in the status of certain lines to which such a console has access. Accordingly, in using a system such as shown in FIG. 6, the flag memory 75 is used to filter out a large amount of information which is unnecessary. Otherwise, large and expensive processors would be required to determine the status of all lines and report only that information required by a particular console to which the processor is connected. Accordingly, the present system supplies a means of providing the information needed in a manageable fashion.

LINK INTERFACE CARD (LIC)

As will be seen in FIG. 4, the digital telephone system of the present invention has redundant LICs 22, namely two in number, for each switching node to provide redundant logic and switch-over mechanisms that support the functions of critical resources that if interrupted create a disturbance in the system. Due to the nature of these functions, they are all grouped on one card. The LIC 22 is duplicated in the node and is the sole provider of clocks, SSNs, tones and loop-back of highways. The LIC 22 also provides the monitoring of critical resources that are not generated per se on the LIC 22 in order to provide failure detection so that a change over or switching of resources occurs. The LIC 22 is also responsible for providing interconnection of the switching nodes in a multinode system as seen in FIG. 4 where the global LAN 12 is coupled through the LCC 20 and the LIC 22 to the SAN 25. An essential feature of the LIC 22 is a clock generator which provides proper synchronization for all of the cards as illustrated in FIG. 4. A failure of the LIC clock results in a failure of that particular LIC. Generally, the Active LIC provides the primary clock source for the switching node 15 and the Standby LIC has a clock source which is used if clock failure is detected in the Active LIC. Both of the LICs monitor the node clock lines for proper operation.

Figure 7:
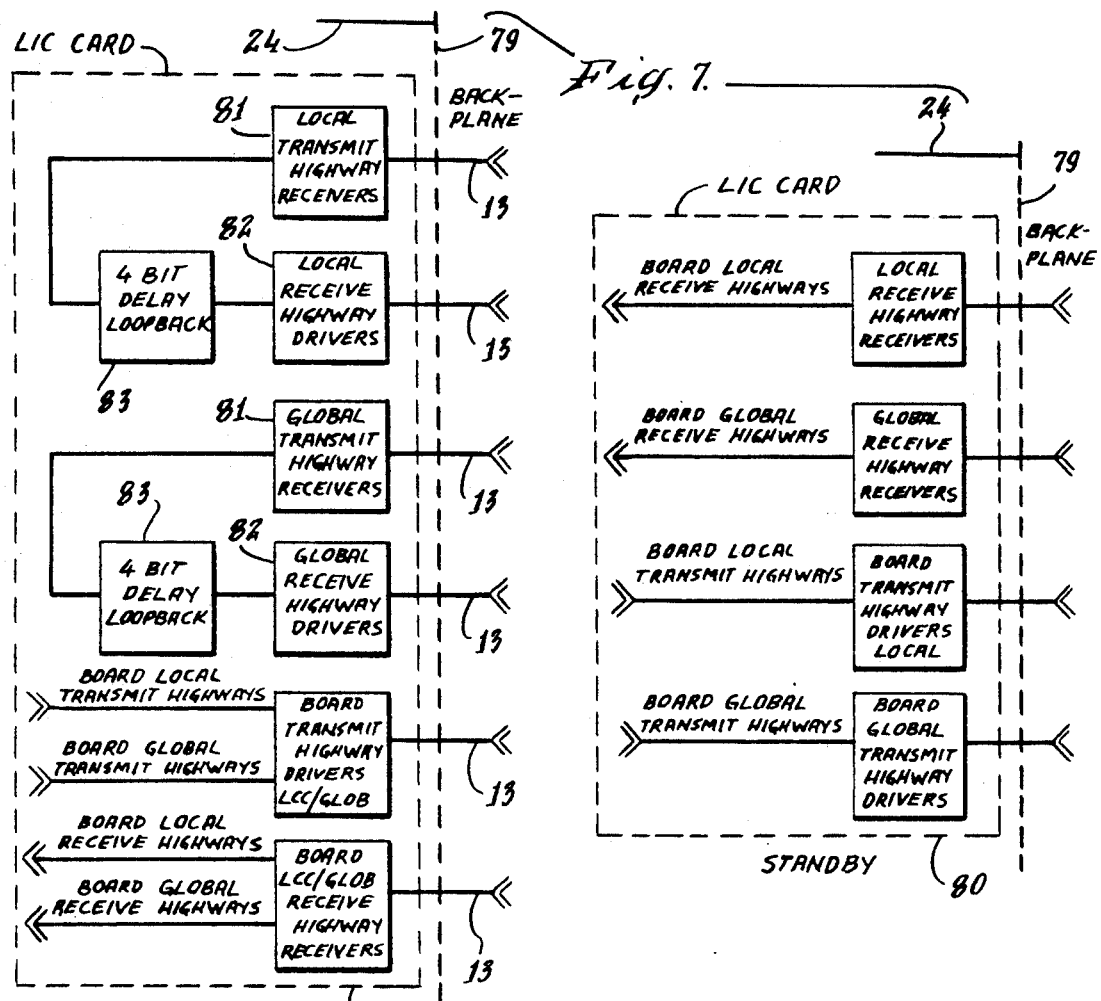
FIG. 7 is a block diagram illustrating the Active and Standby link interface cards.

Referring now to FIG. 7, an Active LIC 78 and a Standby LIC 80 are illustrated diagramatically as mounted in a card cage having a backplane bus 79 supporting interconnections to highways 13 to form the global and node TDM highways 13 as well as the global LAN 12 and SAN 25 media (not shown). Each of the LICs 78 and 80 have clocks which are distributed to all the other cards in the system (See FIG. 4) via the backplane 79 which establish the timing reference for the digital telephone system. The clocks provide synchronization for all the cards in the system. Clocks in the LICs 78 and 80 are continually transmitted, while the SSNs, tones and TDM highway loop back are transmitted to the TDM highways only by the Active LIC 78. There are two sets of clock media on the backplane 79; primary clock media used by the primary LIC (slot one at node 15) and secondary clock media used by the secondary LIC (slot three of node 15).

As noted previously, each SN 15 has 16 TDM highways some of which are dedicated. Non-dedicated highways are those whose time slots are allocated by the Active LIC 78. The sixteen transmit TDM highways are looped to form the sixteen receive TDM highways by the LIC 78. This circuitry includes local transmit highway receivers 81 and local receive highway drivers 82 with a 4 bit delay loop back circuit 83 coupled therebetween for inserting a 4 bit delay to synchronize the highways with the master highway clock (MHC) and then transmitting the receive highways onto the backplane 79. The Standby LIC 80 seen in FIG. 7 will only be enabled for this function when the Active LIC 78 fails.

Figure 8:
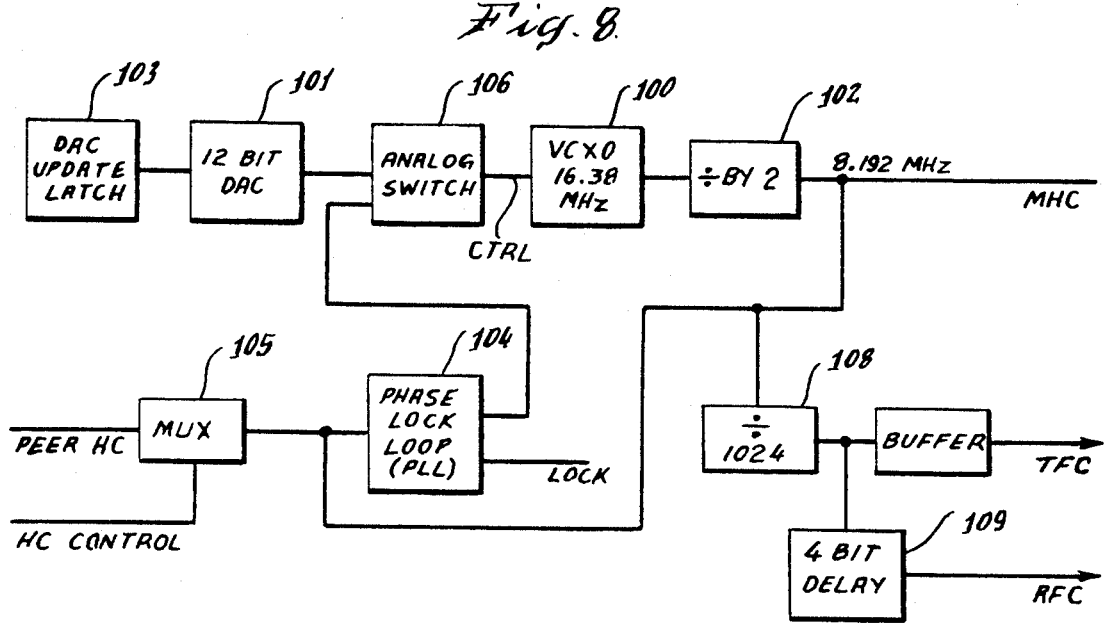
FIG. 8 is a block diagram illustrating the clocks for the LICs.

The clocks for the LICS 78 and 80 may be furnished by a voltage controlled crystal oscillator 100 as shown in FIG. 8. The frequency of the oscillator 100 is divided to produce a highway clock (HC) and a frame clock (FC). The FC has two versions for the transmit highway (TFC) and the receive (RFC) as will be explained.

The master highway clock (MHC) on the Active LIC 78 is produced by dividing the output of the VCXO 100 at 16.38 MHz in divide by two circuit 102. The MHC thus has a fifty/fifty duty cycle at a frequency of 8.192 MHz. On the Standby LIC 80, the other or Peer clock is phased locked to the clock on the Active LIC 78 by a digital phase lock loop (PLL) 104. The Peer clock is fed through a multiplexer 105 to the PLL 104. The Active LIC 78 clock is controlled by a voltage at the control pin of the crystal 100 which is provided by 12 bit digital to analog converter 101 whose value is set to the mid point by software or is constantly updated by an input from a digital reference present in the system. The updates from update latch 103 allow the system to provide synchronization to an external digital clock reference. The DAC 101 and the PLL 104 are coupled to the VCXO 100 through an analog switch 106.

Master frame clock (MFC) is produced by dividing the MHC by 1024 shown as divide circuit 108. This clock has a one bit low and 1023 high duty cycle which is used as a timing reference for the beginning of the 125 microsecond frame. The MFC clock is low during the last bit time of a frame and is the basis for transmit and receive frame sync signal. The transmit frame clock (TFC) is used to synchronize the start of a frame on the TDM highways and is equivalent in frequency and phase to MFC. A receive frame clock (RFC) is used to synchronize the start of a frame on the receive TDM highways. The receive highways are delayed by 4 bit times by the 4 bit delay 109 which enables both transmission and reception simultaneously within the same frame. Therefor, the RFC is equivalent in frequency but is phase shifted (delayed) by 4 bit times from TFC.

LINK INTERFACE CARD TONE GENERATION

Audible tones for use as call progress tones in a SN 15 are generated by LIC 78 and 80 in the same manner but only the Active LIC 78 transmits the tones in time slots onto the highway. The tones are a series of PCM bytes which when played through a CODEC in the proper sequence are converted to an analog tone.

Figure 9:
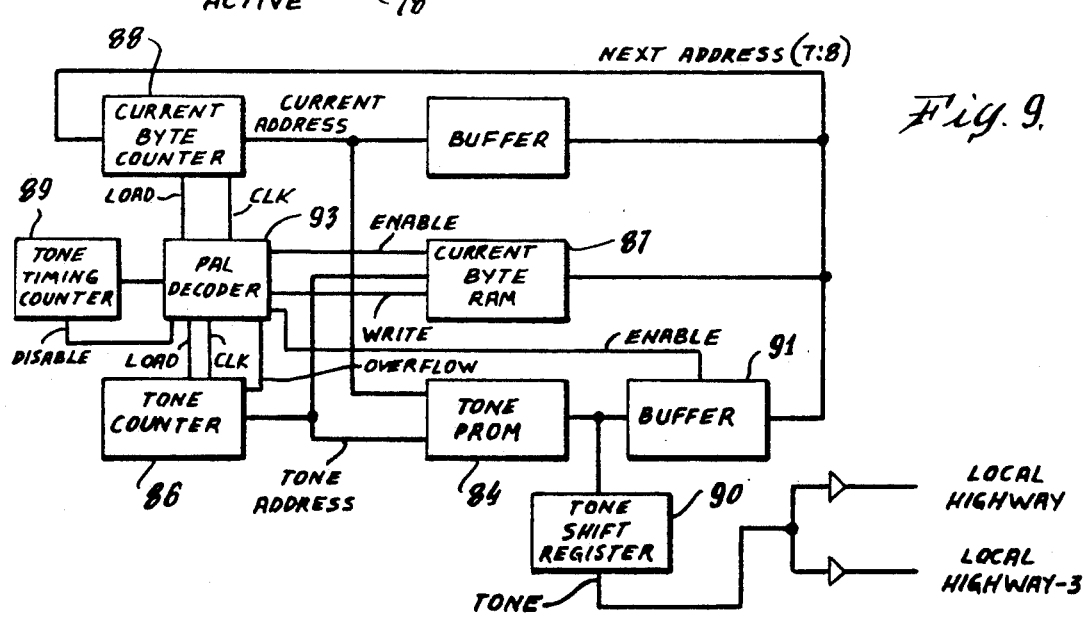
FIG. 9 is a block diagram of the tone generator for the link interface cards.

There are 64 tones possible with a maximum byte length of 255 bytes. The tone patterns are programmed into a tone PROM 84 as shown in FIG. 9. The PROM 84 contains the 64 tones programmed on page boundaries The tones are of varying length from 1 to 255 bytes long. The byte stored at address 0 for each page has the total byte length of the tone pattern.

Three sets of counters are used to produce the tones. A tone counter 86 generates the most significant six address bits for the PROM 84. The tone counter 86 also addresses a current byte RAM 87 which indicates which tone of the 64 is being accessed. The current byte counter 88 generates the least significant 8 bits for the tone PROM 84. This determines which byte of the tone is transmitted to the TDM highway. The third counter, tone timing counter 89, which is coupled through a programmable array logic (PAL) 93 to the tone counter 86, the current byte RAM 87 and the current byte counter 88, provides the timing and synchronization for transmitting the tones onto the TDM highway.

The current byte RAM 87 is used to store the pointer that determines which byte of the tone will be transmitted next. It is written to each time a byte from a tone is sent to the highway. The bytes in current byte RAM 87 will count down from the start of the tone to the last byte.

A tone shift register 90 which is coupled to the PROM 84 is a parallel to serial converter which is synchronously loaded at the beginning of each tone time slot The shift register 90 converts the parallel data byte that comes from the PROM 84 into a serial bit stream that is transmitted onto the highway in a particular time slot.

In operation, at the beginning of each frame the tone PROM 84 is being addressed at a particular location. This address is derived as follows:

| A13 | A12 | A11 | A10 | A09 | A08 | A07 | A06 | A05 | A04 | A03 | A02 | A01 | A00 |
|-----|-----|-----|-----|-----|-----|-----|-----|-----|-----|-----|-----|-----|-----|
| a5  | a4  | a3  | a2  | a1  | a0  | b7  | b6  | b5  | b4  | b3  | b2  | b1  | b0  | a = Tone Count (0 to 3 f) 64 total tones
b = Byte address (1 to 255) 255 max byte length.

The resultant byte of data coming from the tone PROM 84 is then synchronously parallel loaded into the tone shift register 90. The shift register 90 is then clocked and the tone is transmitted a bit at a time to the highway.

Once the tone has been parallel loaded into the shift register 90, the rest of the logic can then prepare for the next tone. First, the current byte counter 88 is decremented, and the new value is then stored in the current byte RAM 87. After this value is written to the current byte RAM 87, the tone counter 86 is incremented to the next tone value (in this case a 01). This address is then used to access the current byte RAM 87 and to read the current value that is stored. The current value is then parallel loaded into the current byte counter 88. If this value is a zero, the underflow is indicated by the counter 88. This value is then used as the least significant eight bits of the address for the tone PROM 84. When the underflow is indicated by the current byte counter 88, a buffer 91 that is between the tone PROM 84 and current byte counter 88 is enabled by the PAL decoder 93 and another value (total length of the tone) is then loaded into the current byte counter 88. Now the current byte counter 88 will be pointing at the first byte of the tone pattern that is stored in the tone PROM 84. One access time later, the data at the output of the tone PROM 84 is ready to be loaded into the tone shift register 90 and transmitted to the highway. This pattern of operation continues until the last (64th) tone has been transmitted onto the highway. At that point, the shift register 90 will keep clocking but no new tone bytes will be loaded into it; therefore it will be transmitting all ones. When tone counter 86 overflows (after the 64th tone), the tone timing counter 89 which generates the timing signals for the tone production will stop.

STATUS SEQUENCE NUMBERS

Figure 10:
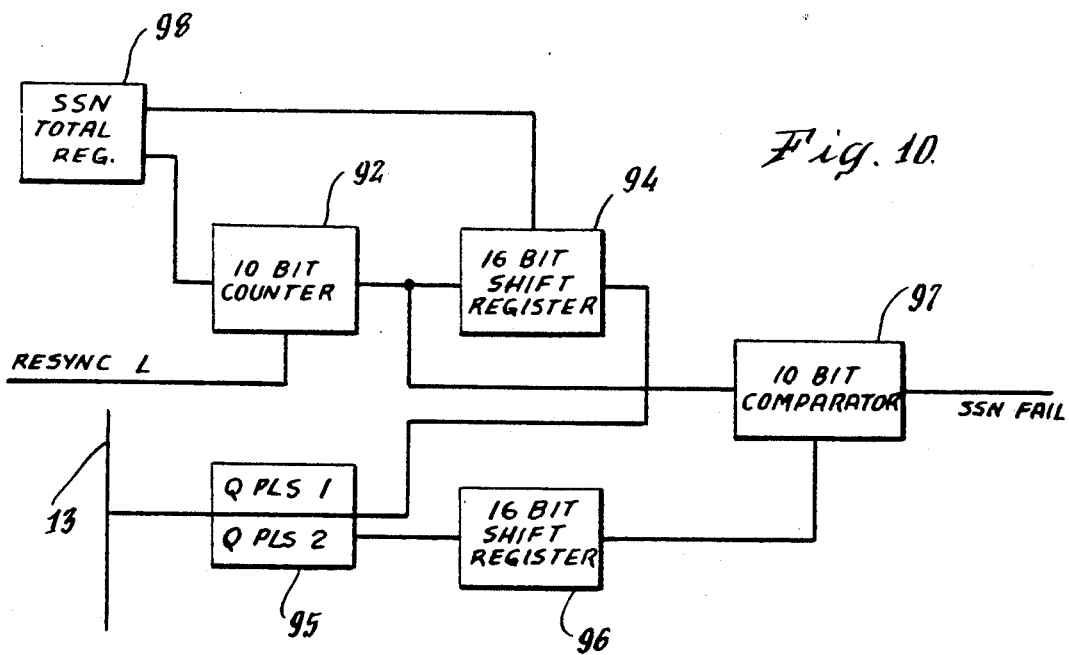
FIG. 10 is a block diagram of the status sequence number generator and comparator in the link interface card.

Referring now to FIG. 10, status sequence numbers (SSNs) are generated from a 10 bit down counter 92. These numbers are then loaded into a 16 bit parallel in/serial out shift register 94. The SSNs are then transmitted to the highway using a serial mode in the QPLS 95. These numbers are loaded into the shift register 94 on the Active LIC 78 and the load is masked on the Standby LIC 80 so the SSNs are transmitted only by the Active LIC 78.

At the beginning of every frame, the SSN Counter 92 is decremented. This 10 bit SSN is then parallel loaded into the shift registers 94. The numbers are then transmitted one bit at a time to the TDM highways through the QPLS chip. Once the counter 92 underflows, it is parallel loaded and the sequence numbers start again at maximum count. Maximum count can be controlled by programming the register 98 in software.

LIC RESOURCE MONITORING

The two LICs 78 and 80 monitor the critical resources for the purpose of failure detection. This provides the signals necessary for the switchover logic to make decisions about causing a switch of the LICs. These signals come from individual monitors of highway clock, frame clocks (both TFC and RFC), and SSN generation. Depending on whether the LIC is active or standby and which monitor circuitry is involved, the LIC is either monitoring a resource coming from the other LIC or is monitoring a resource that the LIC is producing.

In addition, the LIC monitors resources that are critical to the node that are not generated by the LIC. These resources include TDM Highways 13, LANs 12 and SANs 25.

STATUS SEQUENCE NUMBER MONITOR

The SSNs are monitored on both the Active LIC 78 and the Standby LIC 80. The Active LIC 78 generates an SSN and also receives the SSNs from the QPLS. The Standby LIC 80 does not generate the SSN but LIC 80 receives the SSN for monitoring purposes.

The SSN monitoring on both LICs is accomplished in the same manner. In FIG. 10, through a serial mode in the QPLS 95, the SSN is received from the TDM receive highway. This SSN is then compared in a 10 bit comparator 97 to an expected value. If the value is incorrect, then a failure is reported to the Peer LIC. If both LICs are in agreement, then the failure is also sent to the switchover logic. If only one LIC is reporting a failure, the software is notified and the decision of SSN validity is left for the software to determine.

The SSN from the receive highway via QPLS 95 is shifted into two 8 bit serial to parallel shift registers 96. This value is then compared in comparator 97 with a value from the SSN generation logic on each of the LIC boards. The counters are synchronized on the Standby LIC to provide for proper detection of failure. This synchronization is accomplished through the software asserting the RESYNC_L signal which puts the SSN counters into parallel load. The SSNs are then read until the value is equivalent to the value that is being parallel loaded. At this point, RESYNC_L is removed and the counters will be synchronized. Once the counters are synchronized, the failure logic is ready for operation.

HIGHWAY CLOCK MONITOR

The highway clock monitors of LIC 78 validates the PEER LIC 80 highway clock by using the master clock (MCLK) on the LIC 78 as a reference. This monitoring is accomplished via an edge detection scheme, in which an edge on the highway clock of LIC 78 is looked for within three edges on the MCLK. The MCLK is the 16.384 MHz VCXO 100 which is the source of the TDM clocks for the LICs 78 and 80. These signals are phase locked in order for the monitoring circuit to properly operate. This phase locking is accomplished using a digital phase locked loop (PLL) 104 (See FIG. 8). Once the signals are in lock, the monitoring circuit will provide a node highway clock fail (NHC_FAIL) to the switchover logic. This signal is also transmitted to the PEER LIC 80 and becomes PEER_NHC_FAIL to the Peer LIC's switchover Logic. These signals with respect to switchover are more fully explained hereinafter.

RECEIVE FRAME CLOCK MONITOR

Figure 11:
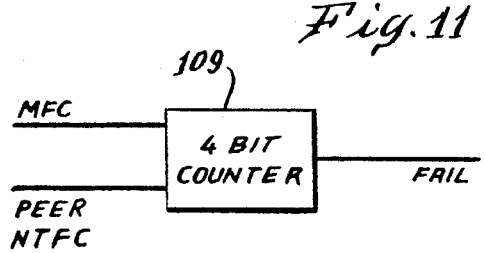
FIG. 11 is a simplified block diagram of the receive frame clock monitor.

The other LICs receive frame clock (PEER_NRFC) is monitored using the LIC master frame clock (MFC) signal as illustrated in FIG. 11. A four bit down counter 109 is used to count the number of highway clocks that are between MFC on this LIC and PEER node transmit frame clock (PEER_NTFC) generated on the peer LIC. A maximum of seven bit times is allowed before a failure is reported. If the counter 109 underflows an edge is produced and the failure is detected. This failure is sent to the switchover logic on this LIC as well as the switchover logic on the Peer LIC via the PEER_NTFC_FAIL signal.

In order for the frame clock monitor circuitry to work properly, the frame clock from the Standby LIC 80 must be synchronized with the frame clock from the Active LIC 78. This synchronization is accomplished using the frame clock from the Active LIC 78 to parallel load the frame clock generator clock on the Standby LIC 80.

TRANSMIT FRAME CLOCK MONITOR

Figure 12:
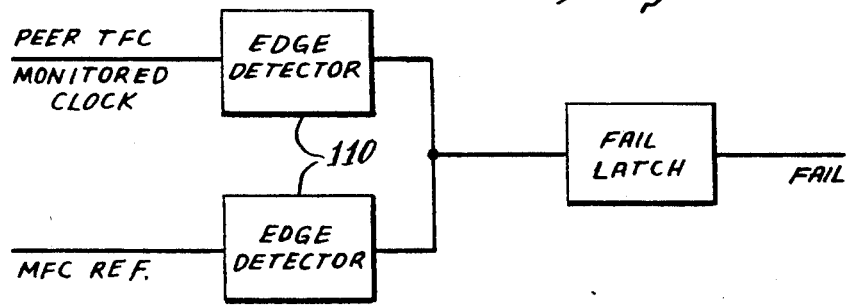
FIG. 12 is a block diagram of the transmit frame clock monitor.
Figure 13:
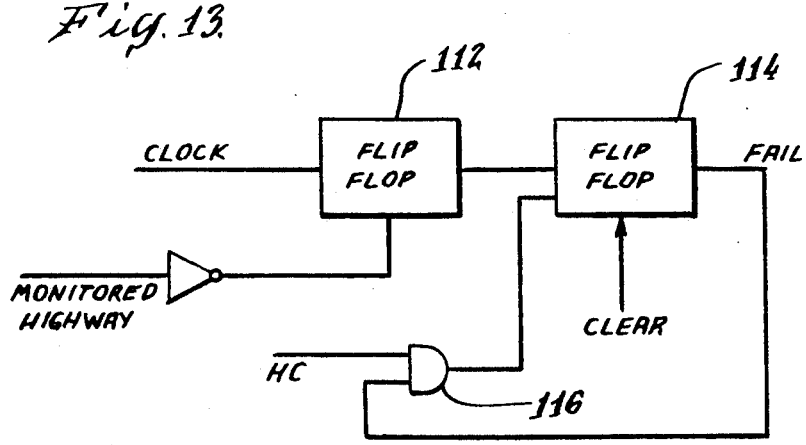
FIG. 13 is a block diagram of the highway clock monitor.

The PEER LIC's transmit frame clock (TFC) is monitored using the transmit frame clock produced on the LIC (MFC) as a reference as illustrated on FIG. 12. This implies as with the other clocks that this clock must also be synchronized to the transmit frame clock on the LIC being monitored so that the failure circuitry can report valid failures.

The monitoring is accomplished by detecting the low to high transition of the reference clock as well as the monitored clock in edge detectors 110. Two edge detectors are provided for monitoring the clocks, one for each LIC. Both edges, the one from the reference clock and the one from the monitored clock should appear between two rising edges of master highway clock. If these edges do not occur within the prescribed time then a failure of the monitored clock is reported from a fail latch 102.

HIGHWAY MONITOR

The TDM receive highways 13 are monitored for a stuck at zero condition which would be an indication of a failure of some part of the highway logic. Since the highway should normally be at a logic state one when no one is transmitting data, a highway that is low for two frame clocks is determined to be in failure.

This circuitry is implemented using two D-type flip-flops 112 and 114. The first flip-flop 112 is held in constant reset whenever the highway that is being monitored is at a logic one. When the highway is at a logic zero the flip-flop is clocked with TFC divided by two. If the highway is low, then a one will be clocked into the first flip-flop 112. This value will then be stored into the second flip-flop 114 on the next rising edge of highway clock. Once a failure is reported, the clock to the flip-flop 114 in the second stage is gated by an AND gate 116 until the latch is cleared by the software. This allows for the storing of an intermittent failure.

TONES MONITOR

The Tones are monitored by software. A decrementing count is stored as the last tone. The tone can then be verified by using the QPLS 95 to read time slot. This time slot is then verified and the tones are validated. If an error is found, then a switchover can be created by the software.

SWITCHOVER LOGIC

The switchover logic controls switching between the two LICs and is designed to produce only one Active LIC. Upon failure of a resource, the switchover logic provides a switch command signal to the other LIC. The logic is also responsible for reporting failures of both LICs to the software so that a LIC with a failure can be removed from the system quickly. The switchover logic controls the active/standby signal and is therefore the logic that determines which LIC is active. It also controls the clock select line which is determined by the slot number of the LIC. The switchover logic is performed using a number of PALs as shown in FIG. 14. The functionality of the logic has been divided among a software status PAL 118, a fail PAL 120, and a switchover state machine PAL 122.

SOFTWARE STATUS PAL

The function of the software status PAL 118 is to decode software states. These states are programmed by both the Active and the Standby LIC. The present state of the LIC and the Peer LIC is signified by the value of the state. These states are used by the switchover PAL 122 to determine conditions for switchover. The state transitions are also synchronized by the clock used by the switchover state machine PAL 122. This synchronization will prevent improper transitions.

FAIL PAL

The function of the fail PAL 120 is to decode the fail signals that are provided by the monitor circuitry on both LICs. The software switch mechanisms are also arbitrated by the fail PAL 120.

The fail signals are reported from each of the monitoring circuits on both LICs. These signals are then interpreted as to whether they should create a switch based on which fail signals are present. The outputs of PAL 120 are NCLK_FAIL, COMB_FAIL, SW_LSWITCH, and SW_PSWITCH.

NCLK_FAIL is a combination of the failures from the LIC clock monitor logic along with the SSN_FAIL signal. This monitor logic is actually monitoring the Peer clocks; therefore, a switch will only be executed if the signal is active and this LIC is Standby.

COMB_FAIL is a combination of the failures from the Peer LIC monitor logic and the SSN_FAIL signal. This signal is an indication that the Peer LIC has detected a failure with the clocks this LIC is producing; therefore, a switch will only be executed if the COMB_FAIL signal is active and this LIC is active.

SW_LSWITCH is an indication that the LIC software has determined a failure which requires that this LIC no longer be active. The Peer has a signal which will prevent the switch from taking place, thus, PAL 120 controls the arbitration and will produce a switch signal only when the Peer is capable of becoming Active.

SW_PSWITCH is an indication that the Peer LIC has requested a switch. The LIC can prevent a switch from taking place by asserting a signal which indicates that it is not able to become Active. The arbitration between these two signals is done in the Fail PAL.

SWITCHOVER STATE MACHINE PAL

The switchover state machine PAL 122 receives the signals from the software status PAL 118 and the fail PAL 120 and interprets them to control the state of the LIC at a particular time.

Referring to FIG. 15, from Power On Reset (POR)1, the LIC proceeds to one of two states. This is determined by whether the LIC is the Primary or Secondary LIC and whether the other LIC is present and is in the Active state. The LIC proceeds to Power On Active (POR) 2 if it is either the only LIC in the system or if there are two LICs, it is the Primary LIC, and the Peer LIC is not in the Active state. The LIC proceeds to Power On Standby3 if either there are two LICs and it is Secondary, or the other LIC is in the Active state.

The transition from Power on Active2 to Active occurs once the software has booted and determined that the card is operational. This transition 4 occurs when a two is written to the state register.

The transition from Power On Standby3 to Standby occurs once the software has booted and determined that the card is operational. This transition 5 occurs when a three is written to the state register.

Transitions from Active to Standby occur based on the COMB_FAIL signal as defined earlier. This event would be the result of a failure of this LIC detected by either the software or hardware.

Transitions from Standby to Active occur based on the NCLK_FAIL signal. This signal would be the result of a failure on the Peer LIC as detected by the software or hardware on this LIC.

SWITCHOVER OF MONITORED RESOURCES

The resources that are only monitored by the LIC are switched based on a failure of the resource. Since the failure that occurs is not an indication that the LIC has failed, the resources are reallocated without producing a switching of the LIC cards. The faulty resources are reallocated such that the failed portion is not utilized.

A failure of a particular TDM highway is reported to the software through a register. This register is scanned and the resulting failure causes a switching of the resources that were allocated on the TDM highway to another TDM highway. In the case of the tones and the SSNs a preassigned backup highway has been defined to be utilized in the event of the failure of the primary media.

A failure of the SAN media that is reported will result in switching of the SAN media that the cards are currently using for communication. This failure is reported to the software in the same manner as the TDM failure. The SM_SAN_SEL signal is then changed by the software to reflect the new SAN media and all the cards are then notified of the change via an interrupt to the microprocessors.

LINE CALL AND CALL RELEASE

Referring again to FIG. 4, an illustrative example of a sample call procedure is initiated by depressing a button field key on the console 34 at the workstation 17. This procedure initiates a line set-up in which the console 34 determines the line the key is associated with, sends a set-up message to the SCC 30 which acknowledges receipt of the set-up message. A message is then communicated from the SCC 30 to a corresponding ACC 26 over SAN 25. The ACC 26 and the associated ALC 29 are a matched pair of cards in which the ALC 29 is basically an interface and protection card which is monitored and controlled by the ACC 26.

The ACC 26 includes a software module that performs the control and monitoring of the ALC 29. If available, a line 31 coupled to the ALC 29 is seized by the closure of the tip and ring relays. A dial tone appears on the related line and the ACC 26 send a set-up acknowledgement back over the SAN 25 to the SCC 30, and then an acknowledgement is sent from the SCC 30 back to the console 34. Digits are then dialed on the key pad, called in band signalling, on the console 34 which are transmitted from the SCC across the TDM 13 in the time slots temporarily alotted to handle tone generation as previously described. Dialing occurs from the console 34 via SCC 30 to ACC 26 over the SAN 25. The SAN message instructs the ACC 26 to connect the line to the tone highway TDM 13 for a configurable amount of time. Voice transmission then takes place on the TDM highway 13 and is terminated at the console. The console initiates a release message to the SCC 30 which clears its time slot and forwards the message over SAN 25 to the ACC 26. The ACC 26 instructs its line interface to release the line. The line interface sends a port idle message to the ACC 26 which in turn sends a release complete message over SAN 25 to SCC 30. The console 34 receives a release complete message from the SCC 30.

Configuration of the line parameters and consoles is handled by the external computer. In an example chosen for purposes of disclosure, four consoles 34 each controlling two handsets 33 are controlled by an SCC 30. Each ACC 26 locally controls 16 lines, but there is no central control over any of these resources.

Accordingly, a new modular digital telephone system is provided which substantially modifies the TDM digital system of the aforesaid patents by providing call processing between any resources interfaced to TDM highways which processing is completely supplied at the interfaces. Accordingly, no direct DC connection and no central processing of calls takes place in this system. Status broadcasts are continually provided on the communication highways which can be accessed by an interface having resources coupled by that interface to the highways that require it. In addition, fault monitoring and redundancy of critical functions, e.g. LICs, are provided to keep the system operational even in the face of a failure of a particular portion of the system which in accordance with the present invention is isolated and switched out of the system until replaced or repaired.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A method of switched communication between nodes, workstations and other resources of a modular digital telephone system and public network resources such as central office telephone lines, tie lines, private and hybrid wide area networks using shared time division multiplexed (TDM) highway signal paths comprising the steps of:
   mounting a plurality of circuit cards having selectable circuitry thereon in at least one card cage having a backplane;
   interfacing the cards with the backplane of the card cage in which the cards are mounted;
   forming a plurality of TDM highways, token passing communications media, Local Area Network (LAN) and Small Area Network (SAN), by interconnecting selected circuitry on said circuit cards on said backplane;
   coupling resources to said cards permitting the intercommunication between said resources via said TDM highways;
   dividing said signal paths on said TDM highways into time slots; and
   performing all call processing between resources by exchanging requests directly on said token passing communications media, SAN and LAN, between the resources wishing to communicate whereby signaling between resources is directly exchanged without establishing a direct current connection or using a central processing unit.

2. The method as claimed in claim 1 including the steps:
   generating a plurality of resource status sequence numbers each of which is assigned to a particular resource;
   broadcasting said SSNs in said time slots on the TDM highways;
   recognizing the SSN assigned to a particular resource;
   reporting the status of the resource to the time slot identified as corresponding to the broadcast SSN following the SSN number corresponding to the reporting resource; and
   indicating at each resource destination the status of the reporting resources.

3. The method as claimed in claim 2 including the step of limiting the reporting of status to a destination to only those resources to which the particular destination has access.

4. The method as claimed in claim 1 where in the step of generating SSNs, the numbers are generated corresponding to the position of the circuit cards in a card cage.

5. The method as claimed in claim 1 including the steps of:
   generating resource status data in said modular digital telephone system;
   storing the resource status data generated in the modular digital telephone system;
   comparing new status resource information with old status resource information; and
   reporting and storing any changes in status resource data.

6. The method as claimed in claim 1 including the step of:
   monitoring the TDM highways for failure;
   signalling a failure of a TDM highway; and
   switching to another highway.

7. The method as claimed in claim 2 including the step of monitoring the generation of said SSNs;
   providing a redundant source of SSNs; and
   switching to the redundant source of SSNs on the failure of the generation of said SSNs.

8. The method as claimed in claim 1 including the step of generating tones; and
   applying the generated tones on the TDM highways.

9. The method as claimed in claim 8 including the step of providing a redundant standby tone source;
   monitoring the tones on said TDM highways; and
   switching to the standby tone source on the failure of said generating call processing tones step.

10. The method as claimed in claim 1 including the step of providing an active clock source and a redundant clock source;
    monitoring said active clock source; and
    switching to said redundant clock source on the failure of said active clock source.

11. A modular digital telephone system for providing switched communication between various communication resources such as telephone lines, workstations and other resources using shared time division multiplex TDM highway signal paths having time slots comprising:
    switching module means having card cage means, backplane means and digital card means mounted in said card cage and interfacing said digital card means with said backplane means;
    means for coupling telephone lines to said digital card means;
    means for coupling workstations having handset means connected thereto to said digital card means;
    first interconnecting means on said module backplane means for interconnecting said digital card means for forming a token passing communications media, a small area network (SAN), to provide a call control and signalling path for said telephone lines and workstations coupled thereto;
    second interconnecting means on said module backplane means for interconnecting said digital card means for forming TDM highways for carrying voice and data between said communication resources coupled to said digital card means;
    call processing means on said digital card means for directly exchanging calls between communication resources whereby communication can be established between resources in the modular digital telephone system without requiring a D.C. connection, a central processing unit or any type of a centralized point of control;

link module means;

means for interconnecting said switching module means with said link module means for providing an independent token passing communications media, a Local Area Network and TDM highways for interconnecting voice and data between said switching module means whereby said link module means provides a direct interconnection between the Local Arm Network and TDM highways of the switching module means.

12. The modular digital telephone system as claimed in claim 11 having SSN generator means for generating resource status numbers for identifying each resource in the telephone system which number is based on the position of the digital cards in said card cage;

means for broadcasting said SSNs in said time slots on said TDM highways;

means on each of said digital cards in said system for identifying its own card interface SSN;

comparison means for detecting a change in status of a resource;

storage and reporting means for storing status and reporting a change of status on said TDM highway; and indicating means on each resource for indicating the status of each of the resources to which that resource has access.

13. The modular digital telephone system as claimed in claim 12 having a flag memory means for limiting the reporting of status to resources to which a resource has access for limiting the amount of status information which must be handled by a resource.

14. The modular telephone system as claimed in claim 12 having a redundant SSN generator means;

means for monitoring said SSN generator means; and means for switching to said redundant SSN generator means in the event of failure of said SSN generator means.

15. The modular telephone system as claimed in claim 11 wherein said call processing means includes tone generator means for generating tones; and means for applying said tones to predetermined time slots on said TDM highways.

16. The modular telephone system as claimed in claim 11 having first and second link interface cards mounted in predetermined locations in the card cage means of said switching module;

first and second clock generating means on said first and second link interface cards, respectively, for generating clock signals each on a separate bus, said clock signals being used to synchronize the digital telephone system;

means in said first and second link interface cards for monitoring the operation of the second and first clock generating means respectively; and switchover means for switching clock generating means when said first or second clock generating means is malfunctioning.

17. The modular telephone system as claimed in claim 16 having first and second redundant SSN generator means mounted on said first and second link interface cards, respectively;

means on said first and second interface cards for monitoring said first and second redundant SSN generator means; and means for switching to said first or second link interface cards on the faulty operation of said first or second redundant SSN generator means.

18. The modular telephone system as claimed in claim 16 wherein said first and second link interface cards contain first and second tone generator means, respectively, said first or said second tone generator means comprising an active tone generator;

means for monitoring said first and second tone generator means; and means for changing from said first to said second or from said second to said first tone generator means on the failure of said active tone generating means.

* * * * *